No. 754,051. PATENTED MAR. 8, 1904.
T. W. CRAVEN.
TOY AIR RIFLE.
APPLICATION FILED MAR. 28, 1903.
NO MODEL. 2 SHEETS—SHEET 1.
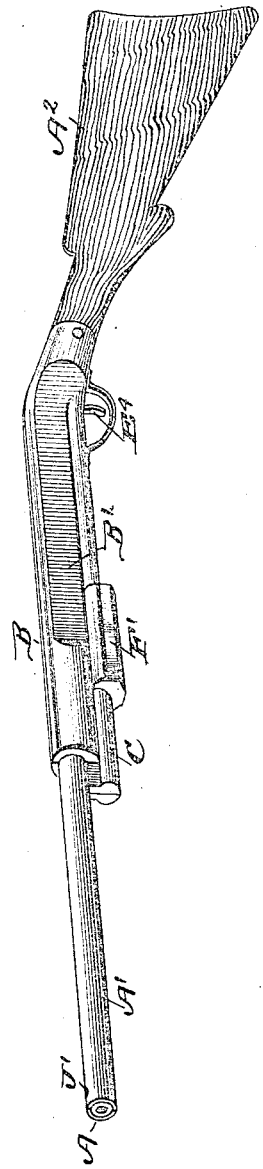

No. 754,051. PATENTED MAR. 8, 1904.
T. W. CRAVEN.
TOY AIR RIFLE.
APPLICATION FILED MAR. 28, 1903.
NO MODEL. 2 SHEETS—SHEET 2.
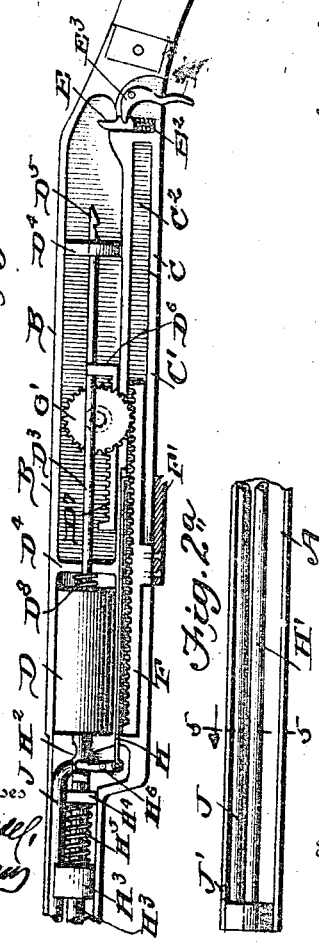
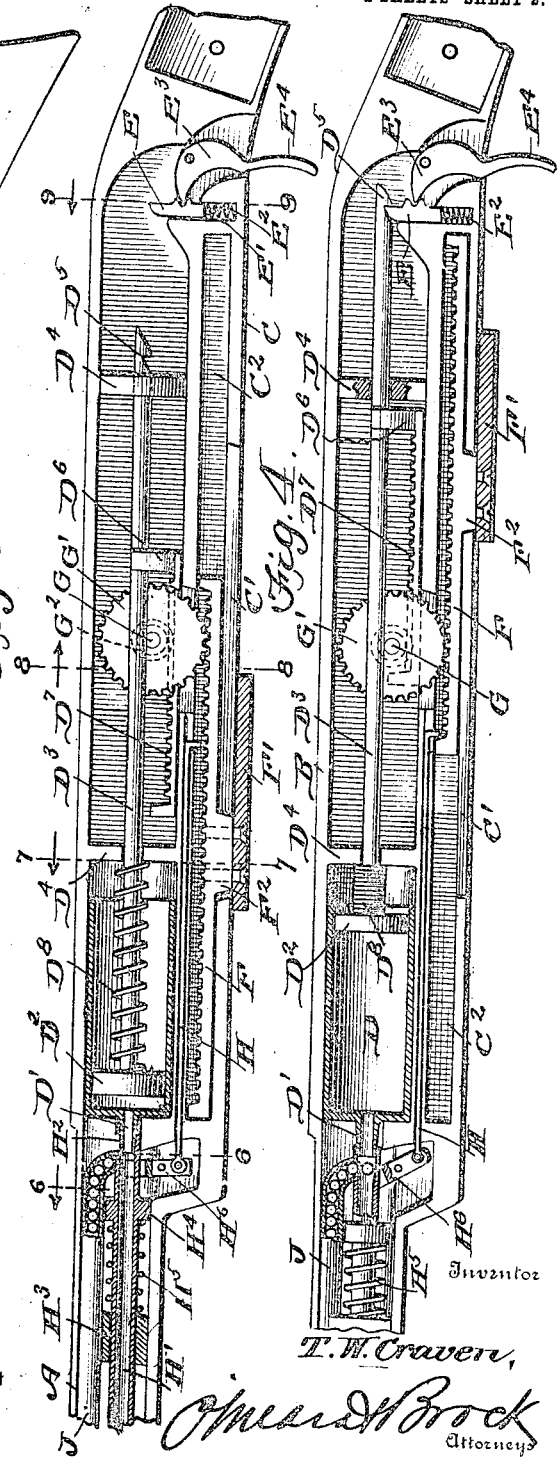

No. 754,051.

Patented March 8, 190[?]

UNITED STATES PATENT OFFICE.

THOMAS WILLIAM CRAVEN, OF FAIRFIELD, CALIFORNIA.

TOY AIR-RIFLE.

SPECIFICATION forming part of Letters Patent No. 754,051, dated March 8, 1904.

Application filed March 28, 1903. Serial No. 149,993. (No model.)

*To all whom it may concern:*

Be it known that I, THOMAS WILLIAM CRAVEN, a citizen of the United States, residing at Fairfield, in the county of Solano and State of California, have invented a new and useful Toy Air-Rifle, of which the following is a specification.

My invention relates to an improvement in toy air-rifles, the object being the construction of a magazine-rifle for shooting shot, and a further object is the construction of a rifle of this kind which will require but little manipulation in the hands of the user.

My invention consists in the novel features of construction hereinafter described, particularly pointed out in the claims, and illustrated in the accompanying drawings, in which—

Figure 1 is a perspective view of my rifle. Fig. 2 is a side elevation, one-half the rifle being removed. Fig. 2ª is a continuation of Fig. 2. Fig. 3 is a side elevation showing the interior mechanism of the rifle. Fig. 4 is a similar view showing the position the parts assume when the slide-action is drawn back. Fig. 5 is a section on the line 5 5 of Fig. 2ª. Fig. 6 is a section on the irregular line 6 6 of Fig. 3. Fig. 7 is a section on the line 7 7 of Fig. 3. Fig. 8 is a section about on the line 8 8 of Fig. 3. Fig. 9 is a section on about the line 9 9 of Fig. 3. Fig. 10 is a perspective view of the plunger-rod and attached rack-bar. Fig. 11 is a perspective view of the slide-action. Fig. 12 is a perspective view of the inner end of the shot-barrel. Fig. 13 is a perspective view of the bifurcated lever for sliding the shot-barrel. Fig. 14 is a perspective view of the spring-actuated sear, and Fig. 15 is a perspective view of the trigger detached.

In the construction of my rifle the barrel and frame are formed in halves A A' and B B', being secured together and also to the wooden stock A² in any desired or convenient manner. Extending longitudinally along the lower side of the frame B B' is a cylindrical extension C, slotted at C'. In the body portion of the rifle is secured a cylinder D, open at the rear and having a nipple D' extending forwardly from the front end into the gun-barrel. In this cylinder is a piston D², having a stem or plunger-rod D³, which extends to a point adjacent the stock, being guided and supported in its rearward and forward movements by the guide-webs. This rod is formed with a notched tapering rear end D⁵, the tapering portion being adapted to contact with and ride over the beveled head of a vertically-arranged sear E, sliding in a socket E', being normally projected upward by a spring E², which when the rod D³ is forced rearward causes the sear to engage the notch adjacent the end. A depending arm D⁶, formed on the rod D³ adjacent its rear end, supports a rack-bar D⁷, which rack is parallel to the plunger-rod, but below and slightly to one side of same. The object of this rack-bar will appear later. A trigger E³ is pivotally secured in the interior of the rear end of the frame and at its upper end has a point engaging a notch formed in the side of the sear E. A finger E⁴ extends downward through a slot in the sear, and when pulled rearward the upper end of the trigger will force the sear downward, releasing its upper end from engagement with plunger-rod. A coiled spring D⁸ surrounds the plunger-rod, the spring bearing at one end on the piston and at the opposite end on the webs.

The extension C is recessed, as shown at C², and in this recess slides a rack-bar F, this bar being about twice the length of the bar D'. A sliding hand-grasp F' is grooved to fit the exterior of the extension. A downwardly-extending shoulder F² extends from the rack F through the slot C', which has communication with the recess C² and is secured by suitable screws to the sliding hand-grasp F'. Thus when the hand-grasp F' is moved backward and forward along the extension, its movement being limited by the length of the slot C', the rack-bar F moves in the recess with it.

A stub-shaft G is secured in the frame B about midway its length, and on this shaft loosely turns a gear G', which extends downward into the recess C² and engages the rack-bar F. A smaller gear G² is also loosely mounted on this shaft and engages the rack D⁷. A gear G³, having laterally-projecting teeth, is secured to the gear G' and bears against the gear G². The gear G³ is cut so that when the gear G' revolves in one direction the gear G² will be engaged by G³ and will likewise revolve; but when the gear G' rotates in the opposite direction the gear G³ will slip. A spring G⁴ normally holds the gears in engagement. Below the cylinder D and above the recess C² is an elongated perforation communicating at the rear with the recess C², and in this slides a rod H, having its rear end bent downward into the recess.

Arranged centrally within the barrel formed by the junction of the parts A A' is an inner barrel H' of a diameter adapted for reception of the shot and slidingly secured in the outer barrel. Above this barrel is a magazine-barrel J, closed at its forward end and open at the rear, the rear end being bent downward, resting on the sliding barrel.

The rear end of the sliding barrel H' fits over the nipple D'. An aperture H² is formed in the upper wall of the barrel H' adjacent its rear end. The barrel H' slides through a collar H³, and to the rear of this collar is a collar H⁴, sliding with the barrel. A spring H⁵ encircles the barrel between these collars and normally holds the rear end of the barrel on the nipple D'. To actuate the barrel, a lever H⁶, bifurcated at its upper end, is pivotally secured below the barrel H' and in the rear of the collar H⁴. The upper bifurcated portion of the lever tightly grips the barrel H'. At its lower end it is pivotally secured to the forward end of the rod H. An aperture J', opens into the forward end of the magazine and serves as a filling-vent.

Having described all the separate parts of the gun, the manner of use and the operation of the parts will be readily understood.

Assuming that the magazine has been filled and that the parts are in the position shown in Fig. 2, the gun is held with one hand and the sliding hand-grasp F' is drawn back with the other. This draws back the rack F, rotating the gears G', G³, and G² in the order named, the gear G² engaging and moving rearward the rack-bar D⁷, which is attached to the plunger-rod D³. In this manner the piston is drawn back against the tension of the spring D⁸. The beveled end D⁵ will engage the beveled head of the sear E, which will engage the notch in the end D⁵, thereby locking the piston in its rear position. At the same time the upturned forward end of the rack-bar F engages the downward-turned end of the rod H, actuating the lever H⁶ and forcing the sliding barrel forward, bringing the aperture H² under the rear end of the magazine-barrel, as shown in Fig. 4, and permitting a shot to be fed into the barrel. The hand-grasp F is pushed forward, bringing the barrel H into its normal position, as in Fig. 3. The piston, however, remains locked in the position shown in Fig. 4. Pressure on the trigger depresses the sear and releases the plunger-rod, and the spring D⁸ forces the piston forward, compressing the air in advance of it and expelling the projectile. The parts having all been returned to their original positions, the operation is repeated.

Having thus fully described my invention, what I claim as new, and desire to secure by Letters Patent, is—

1. A gun of the kind described comprising an outer barrel, a sliding inner barrel, a cylinder at the rear of the sliding barrel, a nipple projecting therefrom, the said sliding barrel fitting over said nipple and being perforated adjacent its rear end, a magazine-barrel having its open rear end turned down on the sliding barrel, a piston in the cylinder, means for drawing the piston rearward, a spring adapted to project it forward, and means for bringing the perforation of the sliding barrel into alinement with the open end of the magazine-barrel when the piston is drawn back.

2. The combination with a gun of the kind described, of a cylinder therein, a piston in said cylinder, a spring adapted to hold said piston in the forward part of the cylinder, a plunger-rod connected to said piston, a rack-bar secured to said plunger, a plate sliding on the exterior of the gun, a rack-bar sliding within the gun, means connecting the last-named rack to the sliding plate, a gear-wheel engaging said rack-bar, a gear-wheel engaging the rack-bar secured to the plunger-rod, means for connecting the two gears when rotating in one direction, and means for locking the plunger-rod in a rearward position.

3. A gun of the kind described comprising a sliding inner barrel having an aperture on its upper side, a magazine normally closed at its rear end by the inner barrel, a cylinder opening at its forward end into said inner barrel, a piston therein, a rod connected to said piston, a plate sliding on the exterior of the gun, a rack-bar connected to said plate and sliding within the gun, a gear engaging said bar, means whereby rotation of the gear in one direction draws the piston to the rear of the cylinder, a lever secured at one end to the sliding barrel, a rod secured at one end to the lever and having its opposite end bent into the path of the forward end of the rack-bar, said rod and lever being adapted to slide the barrel and bring the aperture in alinement with the open rear end of the magazine.

THOMAS WILLIAM CRAVEN.

Witnesses:
D. M. MILLER,
JOEL A. HARVEY.